US010630595B2

(12) United States Patent
Rivera et al.

(10) Patent No.: US 10,630,595 B2
(45) **Date of Patent: *Apr. 21, 2020**

(54) DEVICE AND PROCESS FOR DATA THROTTLING FOR WIRELESS DEVICE

(71) Applicant: TracFone Wireless, Inc., Miami, FL (US)

(72) Inventors: Sergio Rivera, Miami, FL (US); Satish Ramprasad, Miami, FL (US); Sze Ho Wong, Miami, FL (US)

(73) Assignee: TracFone Wireless, Inc., Miami, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 16/451,401

(22) Filed: Jun. 25, 2019

(65) Prior Publication Data

US 2019/0319886 A1 Oct. 17, 2019

Related U.S. Application Data

(63) Continuation of application No. 15/236,853, filed on Aug. 15, 2016, now Pat. No. 10,333,850.

(60) Provisional application No. 62/184,478, filed on Jun. 25, 2015.

(51) Int. Cl.

| | |
|---|---|
| ***H04L 12/813*** | (2013.01) |
| ***H04L 12/26*** | (2006.01) |
| ***H04L 12/14*** | (2006.01) |
| ***H04L 12/825*** | (2013.01) |
| ***H04W 28/02*** | (2009.01) |
| ***H04M 15/00*** | (2006.01) |
| ***H04M 17/02*** | (2006.01) |

(52) U.S. Cl.

CPC .............. *H04L 47/20* (2013.01); *H04L 12/14* (2013.01); *H04L 12/1435* (2013.01); *H04L 12/1467* (2013.01); *H04M 15/00* (2013.01); *H04M 15/8214* (2013.01); *H04M 15/83* (2013.01); *H04M 15/85* (2013.01); *H04M 15/852* (2013.01); *H04M 15/854* (2013.01); *H04M 15/88* (2013.01); *H04M 15/882* (2013.01); *H04M 17/02* (2013.01); *H04L 47/25* (2013.01); *H04W 28/0289* (2013.01)

(58) Field of Classification Search

CPC ..... H04L 47/20; H04L 12/1435; H04L 12/14; H04L 12/1467; H04W 28/0289

See application file for complete search history.

(56) References Cited

U.S. PATENT DOCUMENTS

| | | | |
|---|---|---|---|
| 2012/0108200 | A1 | 5/2012 | Rubin et al. |
| 2012/0294275 | A1 | 11/2012 | Krishnaswamy et al. |
| 2013/0305322 | A1 | 11/2013 | Raleigh et al. |
| 2014/0269563 | A1 | 9/2014 | Wentzloff et al. |
| 2016/0036499 | A1 | 2/2016 | Burchard et al. |

*Primary Examiner* — Gbemileke J Onamuti
(74) *Attorney, Agent, or Firm* — BakerHostetler

(57) ABSTRACT

The disclosure provides a system and method for controlling on a wireless device the amount and speed of data transferred between a wireless device and the Internet, and a wireless device with a metering client that can throttle data speeds and types based on how much data a user has used. Specifically, the wireless device includes a metering client to track one of data usage or an amount of prepaid data available. When the metering client determines that the amount of data available has exceeded a pre-determined threshold, the wireless device inhibits further data transmission amounts and speeds.

19 Claims, 3 Drawing Sheets

WIRELESS DEVICE PROCESS

200: TRANSFERRING DATA BETWEEN THE WIRELESS DEVICE AND A NETWORK OPERATOR CLOUD

202: MODULATING SIGNALS FOR THE TRANSFER OF DATA BETWEEN THE WIRELESS DEVICE AND A NETWORK OPERATOR CLOUD

204: DETERMINING IF DATA USAGE HAS EXCEEDED A PRE-DETERMINED THRESHOLD

206: DISPLAYING AN AMOUNT OF DATA REMAINING FOR USE ON A DISPLAY

208: THROTTLE THE DATA TRANSFER OF AT LEAST ONE OF THE FIRST TRANSCEIVER AND/OR THE SECOND TRANSCEIVER IN REAL TIME

210: UNTHROTTLE THE DATA TRANSFER WHEN THE BILLING CYCLE RESTARTS

DEVICE AND PROCESS FOR DATA THROTTLING FOR WIRELESS DEVICE

CROSS REFERENCE TO PRIOR APPLICATIONS

This application is a continuation of U.S. patent application Ser. No. 15/236,853 filed Aug. 15, 2016 now U.S. Pat. No. 10,333,850 issued Jun. 25, 2019, which is incorporated herein by reference in its entirety. This application also claims the benefit from U.S. Provisional Application No. 62/184,478 filed on Jun. 25, 2015, which is hereby incorporated by reference for all purposes as if fully set forth herein.

BACKGROUND OF THE DISCLOSURE

1. Field of the Disclosure

The disclosure generally relates to a device, system, and process for controlling the amount and speed of wireless data that is exchanged between a wireless network and a wireless device via the system. Specifically, the disclosure relates to throttling data speed for a wireless device by the wireless device based on the amount of wireless data used during a predetermined time.

2. Related Art

Mobile phones and other wireless devices are a popular means for people to connect to the Internet and to transmit data. Many wireless plans allow customers a limited data plan, but even "unlimited" data plans only offer a limited amount of data usage at a certain data speed. After reaching the data limit, such wireless plans reduce speed. This speed reduction currently occurs at the switch level of the network carriers, meaning that network carriers will control the speed reduction process through their infrastructure.

Currently, some wireless device users access the Internet and transmit data through ongoing contracts with a Mobile Network Operator (MNO). In these postpaid plans, wireless device users can purchase a wireless device or wireless access point and pay a substantial rate per month for data usage in order to have general Internet access via the wireless access point. However, extensive Internet access can result in extremely high costs for users. Moreover, these users are tied to long-term ongoing contracts with the MNO. Either one of these aspects can result in the user being subject to unforeseen expenses.

Alternatively, other users access wireless services through a "prepaid plan." Prepaid plans can be provided to users through a Mobile Virtual Network Operator (MVNO). An MVNO is a mobile operator that typically does not own its own frequency spectrum or have its own network infrastructure. Instead, the MVNOs have business arrangements and contracts with MNOs to purchase data usage of their networks.

In either case, prior network oversight of such wireless devices or wireless access points required extensive and complex tracking and control utilizing back end systems for example. In addition, in order to reduce data speed for users who have crossed a data usage threshold, the MVNO typically requests that the carriers control data speed available to users with the infrastructure of the carriers. The result of this process is a significant number of MVNO requests to carriers to control available user data speeds and a limited amount of control by MVNOs over available user data speeds.

Accordingly, there is a need for a system and a process for controlling data speeds at the wireless device handset in real-time in order to give the MVNOs and MNO more control over available user data speeds and to reduce the need for wireless carriers to control data speeds for wireless devices on their networks.

SUMMARY OF THE DISCLOSURE

The foregoing needs are met, to a great extent, by this disclosure, with a system and process for throttling data speeds of a wireless device by the wireless device. Some wireless providers may benefit from such a system and method because the disclosure allows real-time changes in data speed available to the wireless device based on data usage. Additionally, other wireless providers may find it beneficial to use less infrastructure resources and fewer commands for a wireless carrier to throttle or un-throttle data speeds based on data usage. Still other wireless providers may benefit from allowing MVNOs to control the type and amount of data being used by a wireless device connected to the network.

In one or more aspects, a system for controlling data usage on a wireless device is provided and includes a first transceiver on the wireless device configured to transfer data between the wireless device and a network operator cloud, a metering client on the wireless device configured to determine if data usage has exceeded a pre-determined threshold, a computer readable medium on the wireless device configured to store the metering client, a processor on the wireless device configured to execute the metering client, where the metering client is configured to throttle at the device, upon the metering client determining that the amount of data usage has exceeded a pre-determined threshold, the data transfer of the first transceiver.

In another aspect, a method of controlling data usage on a wireless device is provided and includes transferring data between the wireless device and a network operator cloud, modulating signals at the wireless device for the transfer of data between the wireless device and a network operator cloud, determining at the wireless device if data usage has exceeded a pre-determined threshold, and throttling at the wireless device the data transfer of the first transceiver.

In another aspect, a device is provided that includes a first transceiver configured to transfer data between the wireless device and a network operator cloud, a metering client configured to determine if data usage has exceeded a predetermined threshold, and a computer readable medium configured to store the metering client, a processor configured to execute the metering client, where the metering client is configured to throttle, upon the metering client determining that the amount of data available has exceeded a pre-determined threshold, the data transfer of the first transceiver in real time.

There has thus been outlined, rather broadly, certain aspects of the disclosure in order that the detailed description thereof herein may be better understood and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Reference in this specification to a "wireless device" is intended to encompass any compatible computing device that can connect to a wireless network, such as mobile phones, mobile equipment, mobile stations, user equipment, cellular phones, smartphones, handsets or the like (e.g., Apple iPhone, iPad, Google Android-based devices, BlackBerry-based devices, and other types of personal digital assistants or smartphones), wireless dongles, Wireless Fidelity hotspot, laptops, desktops, or other computing devices. The term "wireless device" may be interchangeably used and referred to herein as "wireless handset," "handset," "mobile device," "device," "mobile phones," "mobile equipment," "mobile station," "user equipment," "cellular phone," "smartphones," or "phone."

Further, reference in this specification to a "wireless network" or "network" is intended to encompass any type of wireless network from which an MVNO or an MNO uses to provide wireless data services to a wireless device utilizing a communication channel. The communication channels may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof.

Reference in this specification to "one aspect," "an aspect," "other aspects," "one or more aspects," or the like means that a particular feature, structure, or characteristic described in connection with the aspect is included in at least one aspect of the disclosure. The appearance of, for example, "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
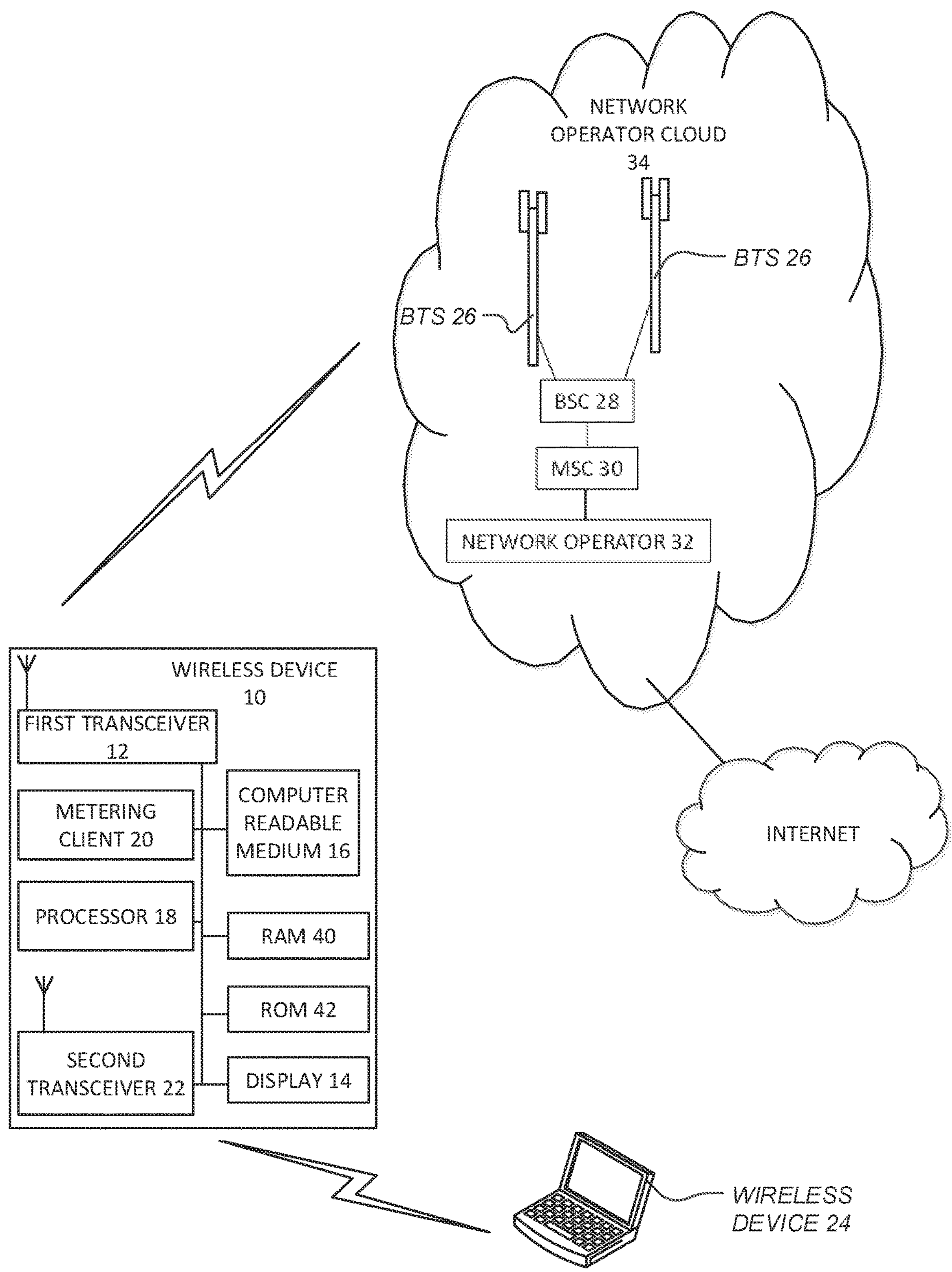
FIG. 1 shows the details of a network operator cloud and a wireless device with a metering client configured to throttle data availability on the wireless device according to an aspect of the disclosure.

FIG. 1 shows the details of a network operator cloud and a wireless device with a metering client configured to control data availability on the wireless device according to an aspect of the disclosure. In particular, FIG. 1 shows a wireless device 10 and a network operator cloud 34. The network operator cloud 34 may include any type of wireless system operating on a communication channel as defined herein. For example, the network operator cloud 34 may include a base transceiver station 26 (BTS), a base station controller 28 (BSC), and a mobile switching center 30 (MSC) overseen by a network operator 32.

The wireless device 10 includes a first transceiver 12, a computer readable medium 16, and a processor 18. The wireless device may include a display 14, a second transceiver 22 and a metering client 20. In one aspect, the FIG. 1 implementation of the wireless device 10 may be a Wireless Fidelity hotspot. In another aspect, the FIG. 1 implementation of the wireless device 10 may be a smartphone that may be configured as a Wireless Fidelity hotspot. The first transceiver 12 can include, for example, a wireless antenna and associated circuitry capable of data transmission with the mobile data network utilizing at least one data transmission protocol, such as, for example, 3G, 4G Long Term Evolution (LTE), 5G, Evolution-Data Optimized (EVDO), Code Division Multiple Access (CDMA), High Speed Packet Access (HSPA), Global System for Mobile Communications (GSM), W-CDMA (Wideband Code-Division Multiple Access), Wi-Fi, Bluetooth, a communication channel as defined herein, and/or the like, and/or combinations thereof. The first transceiver 12 transmits and receives data over the data transmission protocol with the network operator cloud 34.

The first transceiver 12 is further configured to be controlled. In one aspect the first transceiver 12 is controlled by the processor 18 and/or the metering client 20. In this regard, the first transceiver 12 may be controlled with respect to at least one of the following: the radio frequency utilized by the first transceiver 12 on the wireless device 10, control modulation on the wireless device 10, control a combination of frequency and modulation (e.g., quadrature amplitude modulation (QAM)) on the wireless device 10, to control operation of one of the digital bit streams generated by the QAM, and/or to control the data protocol transmission types and speeds. QAM is both an analog and a digital modulation scheme. It conveys two analog message signals, or two digital bit streams, by changing (modulating) the amplitudes of two carrier waves, using the amplitude-shift keying (ASK) digital modulation scheme or amplitude modulation (AM) analog modulation scheme. The two carrier waves of the same frequency, usually sinusoids, are out of phase with each other by 90° and are thus called quadrature carriers or quadrature components.

The second transceiver 22 transmits to and receives data from a wireless device 24. The second transceiver 22 can include, for example, a wireless antenna and associated circuitry capable of data transmission over various data transmission protocols, such as, for example, Wi-Fi or some other communication channel as defined herein. The first transceiver 12 and the second transceiver 22 may be configured as separate devices or a single device. The first transceiver 12, the second transceiver 22, and the processor 18 may be configured as separate devices or combined.

In one aspect of the disclosure, the second transceiver 22 may receive from the wireless device 24, for example, a request to send data to or receive data from the network operator cloud 34. The second transceiver 22 may receive a data request in a modulated signal. The second transceiver 22 then may demodulate the signal for further transmission. The second transceiver 22 formats this message into a protocol appropriate for transmitting data. The first transceiver 12 receives this message and modulates the message for further wireless transmission to the network operator cloud 34. The first transceiver 12 formats the message into an appropriate format for transmission to the network operator cloud 34 using a network data transmission protocol as described above, such as, for example, 4G LTE.

In another aspect of the disclosure, the first transceiver 12 and/or the second transceiver 22 may function as a modem that can modulate and demodulate signals for transmitted data to and from the wireless device 24. The transceiver as a modem may be physical or virtual.

In another aspect of the disclosure, the second transceiver 22 acting as a modem can allow the wireless device 10 to be a tethered modem to connect another device to the internet. Tethering between the wireless device 10 and another device can be accomplished wirelessly (e.g., Bluetooth), wireless fidelity, through a wired connection such as USB, and/or a communication channel is defined herein.

In another aspect of the disclosure, the second transceiver 22 acting as a modem can act as an analog-to-digital or digital-to-analog converter, and can allow for the use of frequency-division multiple access, time-division multiple access, code division multiple access, or space division multiple access.

In another aspect of the disclosure, the first transceiver 12 may receive data from the network operator cloud 34 with a destination for the wireless device 24. The first transceiver 12 may demodulate the received message for further data transmission. The first transceiver 12 may format the message from the network operator cloud 34 into a format appropriate for transmission. The second transceiver 22 may receive a message. The second transceiver 22 may modulate the received message for further wireless transmission to the wireless device 24. The second transceiver 22 may format the data into a format appropriate for transmission using, for example, Wi-Fi, or some other communication channel as defined herein.

The display 14 of the wireless device 10 can be configured to display various information provided to the display 14 from the processor 18 of the wireless device 10, computer readable medium 16, or metering client 20. The screen may be a light-emitting diode display (LED), an electroluminescent display (ELD), a plasma display panel (PDP), a liquid crystal display (LCD), an organic light-emitting diode display (OLED), or any other display technology.

The displayed information can include, for example, the amount of prepaid wireless data service available, the network connection strength, the type of mobile network data connection (such as 3G, 4G LTE, EVDO, etc.) the wireless device 10 is connected to, and/or other information potentially useful to the user. The information may be displayed simultaneously or the user may interact with an input device such as buttons on the wireless device 10 or, if the display 14 is a touch-screen, with the icons on the display 14 to cycle through the various types of information for display. For example, the display 14 may display the amount of prepaid wireless data service available, the network connection strength, and the type of mobile network data connection simultaneously. Alternatively, the display 14 may only display one type of information, for example, the amount of prepaid wireless data service available. The display 14 may then display other types of information if the user interacts with buttons on the wireless device 10 or, if the display is a touch-screen, with icons on the display 14.

The computer readable medium 16 may be configured to store the metering client 20. For the purposes of this disclosure, computer readable medium 16 stores computer data, which can include computer program code that is executable by the processor 18 of the wireless device 10, in machine readable form. By way of example, and not limitation, the computer readable medium 16 may include computer readable storage media, for example tangible or fixed storage of data, or communication media for transient interpretation of code-containing signals. Computer readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules, or other data. In one or more aspects, the actions and/or events of a method, algorithm, or module may reside as one or any combination or set of codes and/or instructions on a computer readable medium 16 or machine readable medium, which may be incorporated into a computer program product.

The computer readable medium 16 may also be configured to store the values for the amount of wireless data service available, the amount of wireless data service used, how many days of wireless service have been used, how many days of wireless service remaining, and the like. The computer readable medium 16 may also store how much data was used for each domain, web address, wireless device application, or other web resource during a given time period, such as, for example, one billing cycle. The computer readable medium 16 may also be configured to store the values when the billing cycle of wireless data service ends and starts.

Additionally, the computer readable medium 16 may communicate to or display on the display 14 the various metrics described above. For example, the computer readable medium 16 may communicate to or display on the display 14 the amount of wireless data service used, the amount of wireless data service remaining, how many days of wireless service have been used, how many days of wireless service remaining, and the like. Similarly, the computer readable medium 16 may also communicate to or display on the display 14 the amount of data sent and received. Moreover, the computer readable medium 16 may communicate to or display on the display 14 the amount of data that may be remaining from the previously purchased and/or credited amount of data.

The processor 18 may be configured to execute the metering client 20. The processor 18 can be, for example, dedicated hardware as defined herein, a computing device as defined herein, a processor, a microprocessor, a programmable logic array (PLA), a programmable array logic (PAL), a generic array logic (GAL), a complex programmable logic device (CPLD), an application-specific integrated circuit (ASIC), a field-programmable gate array (FPGA), or any other programmable logic device (PLD) configurable to execute the metering client.

Additionally, the processor 18 may communicate to or display on the display 14 the various metrics described above. For example, the processor 18 may communicate to or display on the display 14 the amount of data used. Similarly, the processor 18 may also communicate to or display on the display 14 the amount of data sent and received and at which data speed. Moreover, the processor 18 may communicate to or display on the display 14 the amount of data that may be remaining from the previously purchased and/or credited amount of data.

The metering client 20 may be a software application configured to track prepaid data usage and the remaining amount of prepaid data available. The metering client 20 may be written in any programming language, such as, for example, C, Java, Objective-C, C#, Python, Visual Basic, Perl, or any other programming language the processor 18 is capable of executing. The metering client 20 may also meter how much data has been used on a given domain, web address, wireless device application, or other web resource.

Additionally, the metering client 20 may communicate to or display on the display 14 the various metrics described above. For example, the metering client 20 may communicate to or display on the display 14 the amount of data used and at which data speed. Similarly, the metering client 20 may also communicate to or display on the display 14 the amount of data sent and received. Moreover, the metering client 20 may communicate to or display on the display 14 the amount of data that may be remaining from the previously purchased and/or credited amount of data.

In a further aspect, the metering client 20 may throttle data transfer between the wireless device 10 and the network operator cloud 34 or other wireless devices. The metering client 20 may do this in several ways. One way is for the metering client 20 to control radio frequency utilized by the first transceiver 12 on the wireless device 10. In this regard, controlling the radio frequency to slow data transfer. Another way is for the metering client 20 to control modulation on the wireless device 10. In this regard, controlling the modulation to slow data transfer. Yet another way is for the metering client 20 to control a combination of frequency and modulation (e.g., quadrature amplitude modulation (QAM)) on the wireless device 10. In this regard, controlling the frequency and modulation to slow data transfer. Moreover, as QAM utilizes two digital bit streams, data may be throttled by inhibiting operation of one of the two digital bit streams.

In yet another aspect, the metering client 20 may throttle data transfer between the wireless device 10 and the network operator cloud 34 or other wireless devices by controlling data protocol transmission types and speeds that the wireless device 10 can transfer. For example, if a wireless device 10 user reaches a certain level of data usage at a particular speed (e.g., 4G), the metering client 20 may limit further data transfer by reducing the data speed available to the wireless device 10 (e.g., from LTE to 3G). The metering client 20 may also shut down in totality or in sequential order (e.g., LTE, HPSA+, 3G, then 2G) the type of data available to the wireless device 10 once the wireless device 10 has reached a certain level of data transfer at a certain speed. For example, data transfer may be initially using the LTE protocol, as a threshold is exceeded, data transfer may be subsequently at HPSA+. As data usage continues, the protocol may transition to 3G and thereafter with additional data usage, the protocol my transition to 2G. Other approaches to throttling data usage are contemplated as well.

In a particular aspect of the application, computer readable medium 16 of wireless device 10 includes the metering client 20. The metering client 20 may be configured to control use of the wireless device 10 based on interaction with a server, the server provisioning wireless service to the user, or the like. The metering client 20 may utilize an internal accounting module to establish an account with a representation of prepaid funds, available data, or available credit for wireless services. The internal accounting module may also store a plurality of charge rates and may also store a billing algorithm. The internal accounting module can classify each wireless service (data, voice, SMS) into one of a plurality of billing categories; select a charge rate corresponding to that billing category; calculate an appropriate charge for the data usage, voice usage, and SMS usage in real time by using the selected charge rate; and apply this appropriate charge to the account. Once the internal accounting module determines that the amount of wireless service (data, voice, SMS) used has depleted the account, the internal accounting module may interact with the processor 18 to limit, prevent, or control further use of the wireless device 10 or the speed of data available to the user as described herein. The controlled use including suspending wireless data service, limiting wireless data service, throttling wireless data service, and allowing all wireless data service. In this aspect, the data management application may also include a module for one or more system provider host processors, which store wireless device identification information; store operating codes needed for wireless device activation; and store operating codes needed for setting prepaid funds or available credit amounts in wireless device accounts whereby, upon receipt of wireless device identification information from a particular wireless device or its user, the host processor may be capable of ascertaining the operating codes needed to activate that particular wireless device or needed to set its account amount.

Figure 2:
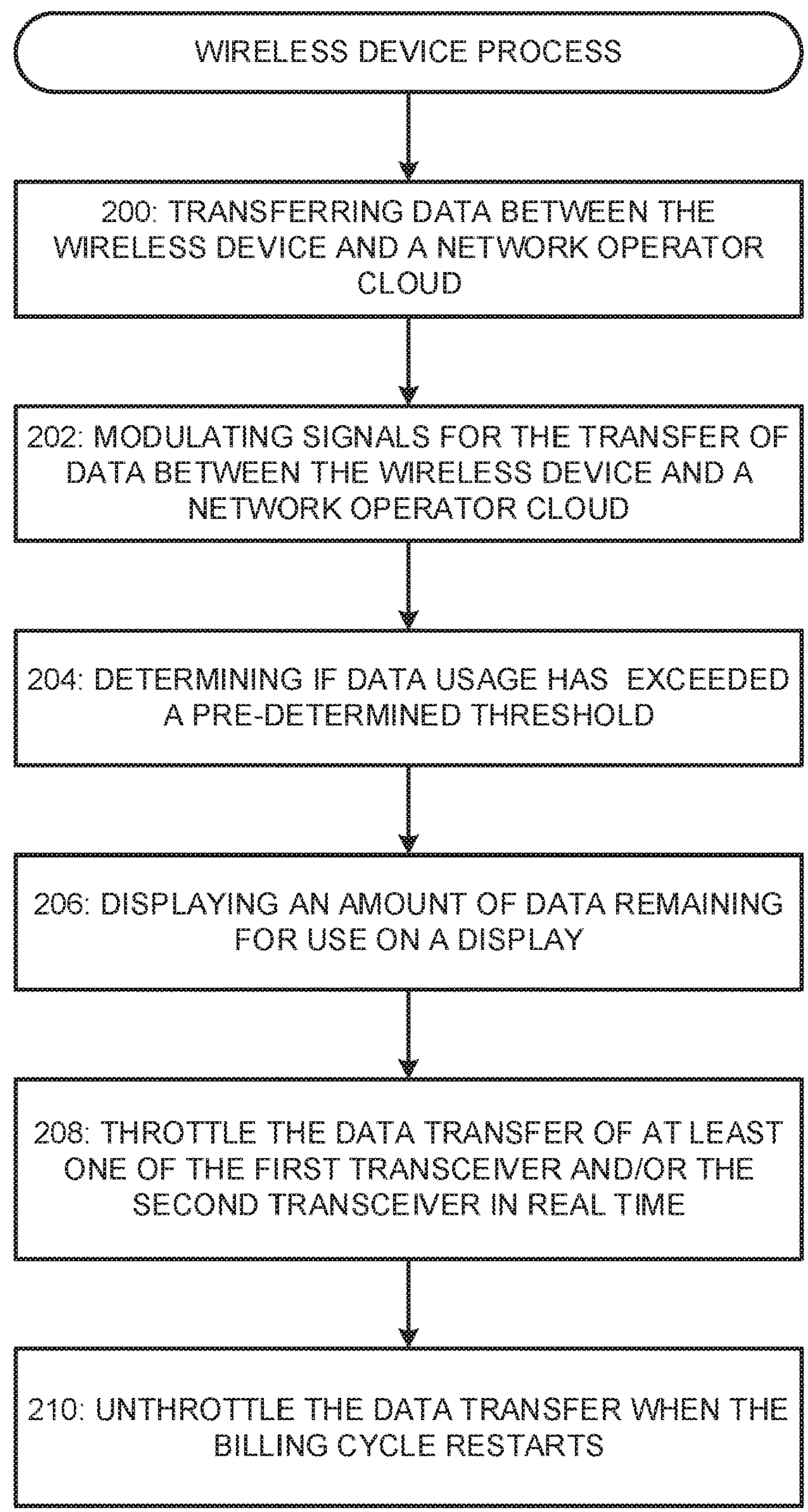
FIG. 2 shows a flowchart detailing the method of how a wireless device may throttle the amount and speed of data transferred between a wireless device and a network operator cloud according to yet another aspect of the disclosure.

FIG. 2 shows a flowchart detailing the method of how a wireless device throttles the amount and speed of data transferred between the wireless device and the network operator cloud according to yet another aspect of the disclosure. In particular, FIG. 2 shows a method of controlling data usage on a wireless device. In Step 200, the wireless device 10 transfers data to and from a network operator cloud 34. In Step 202, the second transceiver 22 modulates signals for the transfer of data between the wireless device 10 and the wireless device 24. In Step 204, the metering client 20 may monitor how much of the allocated data has been used by the wireless device 10. In Step 206, the display may update to display the new remaining amount of data available for use. In Step 208, once the amount of data available for use reaches or exceeds a pre-determined threshold, the metering client may throttle in real time data transfer to and from the wireless device. In one aspect, when the billing cycle starts over, the throttling of data transfer may be thereafter be removed as shown in step 210.

One way throttle data transfer is to control radio frequency on the wireless device 10. Another way throttle data transfer is to control modulation on the wireless device 10. Yet another way throttle data transfer is to control a combination of frequency and modulation (e.g., quadrature amplitude modulation (QAM)) on the wireless device 10.

In yet another aspect, throttling data transfer may be accomplished by controlling data transmission protocol types and speeds that the wireless device 10. For example, if a wireless device 10 user reaches a certain level of data usage at a particular speed (e.g., 4G), data transfer may be throttled by reducing the data speed available to the wireless device 10 (e.g., 3G). The throttling may also shut down in totality or in sequential order (e.g., LTE, HPSA+, 3G, then 2G) the type of data available to the wireless device 10 once the wireless device 10 has reached a certain level of data transfer at a certain speed. Other approaches to throttling data usage are contemplated as well.

Figure 3:
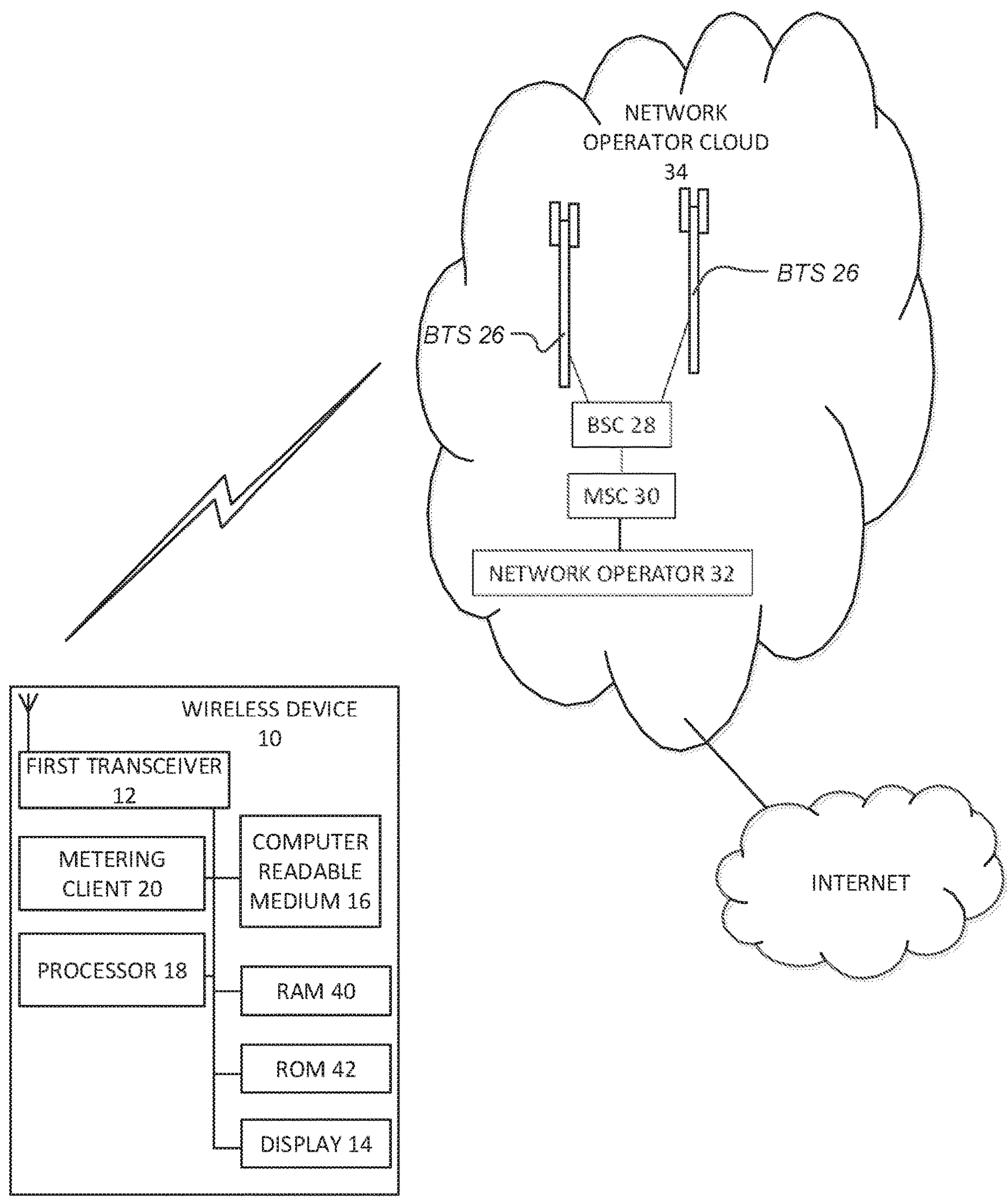
FIG. 3 shows the details of a network operator cloud and a wireless device with a metering client configured to throttle data availability on the wireless device according to another aspect of the disclosure.

FIG. 3 shows the details of a network operator cloud and a wireless device with a metering client configured to inhibit data availability on the wireless device according to another aspect of the disclosure. In the FIG. 3 implementation, there is no second transceiver and the wireless device 10 may operate standalone. In the aspect to FIG. 3, the wireless device may be a smartphone.

Further in accordance with various aspects of the disclosure, the methods described herein are intended for operation with dedicated hardware implementations including, but not limited to PCs, PDAs, SIM cards, semiconductors, application specific integrated circuits (ASIC), programmable logic arrays, cloud computing devices, and other hardware devices constructed to implement the methods described herein.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), W-CDMA (Wideband Code-Division Multiple Access), Wireless Fidelity (Wi-Fi), Bluetooth, Long Term Evolution (LTE), EVolution-Data Optimized (EVDO) and/or the like, and/or a combination of two or more thereof.

The disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

In an aspect, the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

While the device, system, and method have been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A system for controlling a data usage in a wireless device by controlling a transceiver, the system comprising:

a transceiver implemented by the wireless device configured to transfer data between the wireless device and a network operator cloud utilizing a radio frequency and a modulation;

a metering client implemented by the wireless device configured to control the transceiver when a data usage has exceeded a pre-determined threshold;

a computer readable medium in the wireless device configured to store the metering client; and a processor implemented by the wireless device configured to execute the metering client to control the transceiver, wherein the metering client is configured to throttle at the wireless device a data transfer of the transceiver when the data usage has exceeded a pre-determined threshold; and wherein the metering client is further configured to throttle data transfer by the transceiver by controlling the radio frequency and the modulation utilized by the transceiver that comprises controlling the transceiver and modifying a quadrature amplitude modulation utilized by the transceiver when the data usage has exceeded a pre-determined threshold.

2. The system of claim 1, wherein the metering client is further configured to limit, by controlling the transceiver at the wireless device, a type of data that the wireless device can send and receive when the data usage has exceeded a pre-determined threshold.

3. The system of claim 1, wherein the metering client is further configured to throttle data transfer by the transceiver by controlling the radio frequency utilized by the transceiver when the data usage has exceeded a pre-determined threshold.

4. The system of claim 1, wherein the metering client is further configured to control data usage on the wireless device by controlling the transceiver and modifying the quadrature amplitude modulation utilized by the transceiver when the data usage has exceeded a pre-determined threshold that comprises inhibiting at least one of the following: an amplitude-shift keying (ASK) digital modulation scheme or an amplitude modulation (AM) analog modulation scheme.

5. The system of claim 1, wherein the metering client is further configured to shut down a type of data transfer on the wireless device by controlling the transceiver when the data usage has exceeded a pre-determined threshold.

6. The system of claim 1, wherein the transceiver is a physical modem; and wherein the metering client is further configured to throttle data transfer by the physical modem by controlling one of the following: a radio frequency utilized by the physical modem, a modulation utilized by the physical modem, and a radio frequency and a modulation utilized by the physical modem.

7. The system of claim 1, wherein the transceiver is a virtual modem; and wherein the metering client is further configured to throttle data transfer by the virtual modem by controlling one of the following: a radio frequency utilized by the virtual modem, a modulation utilized by the virtual modem, and a radio frequency and a modulation utilized by the virtual modem.

8. The system of claim 1, wherein the wireless device comprises a wireless access point; and wherein the computer readable medium is further configured to store on the wireless access point values for an amount of data available, how much time remains until a user must add additional data, and how much data was used.

9. The system of claim 1, further comprising:

a display screen implemented by the wireless device; and the display screen configured to display at least one of the following: an amount of prepaid data available and an amount of prepaid time available.

10. The system of claim 1, wherein the metering client is configured to interact with a server provisioning a wireless service to control the transceiver when a data usage has exceeded a pre-determined threshold.

11. A method of controlling a data usage in a wireless device by controlling a transceiver, the method comprising:

transferring data between a wireless device and a network operator cloud with a transceiver utilizing a radio frequency and a modulation; and throttling at the wireless device with a processor the transferring of data between the wireless device and the network operator cloud by the transceiver when the data usage has exceeded a pre-determined threshold, wherein the processor is further configured to throttle data transfer by the transceiver by controlling the radio frequency and the modulation utilized by the transceiver by modifying a quadrature amplitude modulation utilized by the transceiver.

12. The method of controlling a data usage on a wireless device of claim 11, wherein the throttling at the wireless device when the data usage has exceeded a pre-determined threshold further comprises limiting a type of data that the wireless device can send and receive by controlling the transceiver.

13. The method of controlling a data usage on a wireless device of claim 11, wherein the throttling at the wireless device when the data usage has exceeded a pre-determined threshold further comprises controlling the modulation utilized by the transceiver for the wireless device.

14. The method of controlling a data usage on a wireless device of claim 11, wherein the throttling at the wireless device when the data usage has exceeded a pre-determined threshold further comprises controlling data usage on the wireless device by modifying the quadrature amplitude modulation utilized by the transceiver that comprises inhibiting one of the following: an amplitude-shift keying (ASK) digital modulation scheme or an amplitude modulation (AM) analog modulation scheme.

15. The method of controlling a data usage on a wireless device of claim 11, wherein the throttling at the wireless device when the data usage has exceeded a pre-determined threshold further comprises shutting down a type of data transfer on the wireless device by controlling the transceiver.

16. The method of controlling a data usage on a wireless device of claim 11, wherein modulating signals at the wireless device for a transfer of data between the wireless device and the network operator cloud is accomplished with a physical modem; and wherein the wireless device is further configured to throttle data transfer by the physical modem by controlling one of the following: a radio frequency utilized by the physical modem, a modulation utilized by the physical modem, and a radio frequency and a modulation utilized by the physical modem.

17. The method of controlling a data usage on a wireless device of claim 11, wherein modulating signals at the wireless device for a transfer of data between the wireless device and the network operator cloud is accomplished with a virtual modem; and wherein the wireless device is further configured to throttle data transfer by the virtual modem by controlling one of the following: a radio frequency utilized by the virtual modem, a modulation utilized by the virtual modem, and a radio frequency and a modulation utilized by the virtual modem.

18. The method of controlling a data usage on a wireless device of claim 11, further comprising:

displaying on the wireless device an amount of data remaining for use on a display device; and the displaying comprises displaying at least one of amount of prepaid data available and an amount of prepaid time available on the display device.

19. The method of controlling a data usage on a wireless device of claim 11, wherein the throttling at the wireless device when the data usage has exceeded a pre-determined threshold is based on an interaction with a server provisioning a wireless service.

* * * * *